Figure 1:
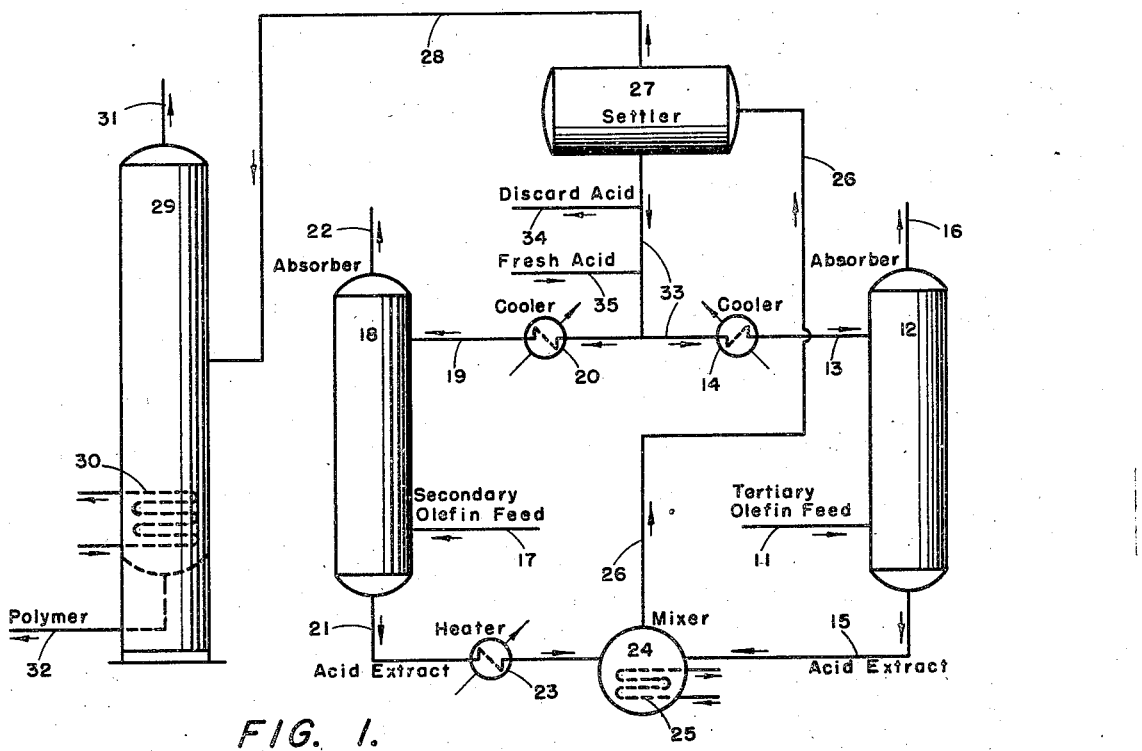

July 15, 1947.  O. A. BROWN  2,424,143

POLYMERIZATION OF OLEFINS

Filed Aug. 7, 1944

Orval A. Brown INVENTOR.

BY J. D. McKean
ATTORNEY.

Patented July 15, 1947

2,424,143

UNITED STATES PATENT OFFICE 2,424,143

POLYMERIZATION OF OLEFINS

Orval A. Brown, Baytown, Tex., assignor to Standard Oil Development Company, a corporation of Delaware Application August 7, 1944, Serial No. 548,442

6 Claims. (Cl. 260—683.15)

1

The present invention is directed to a process for conducting reactions between different olefins which are usually designated as interpolymerization reactions in distinction to the combination of like olefins which is termed copolymerization. The invention is directed particularly to a process for interpolymerizing secondary olefins with tertiary olefins in the presence of a liquid catalyst to form a higher boiling polymer.

The polymerization of olefins in the presence of a liquid catalyst is well known to the art but heretofore no satisfactory process was known for directing the reactions to yield predominantly an interpolymer including a plurality of olefins of dissimilar molecular weights and having a molecular weight substantially greater than the sum of two molecules of the olefin feed to the process. As an example, it has been common to treat a hydrocarbon mixture of isobutylene, normal butylene and propylene with hot sulfuric acid but since the tertiary olefin is the more readily polymerized a result of such a treatment is the formation of a major portion of octenes and a minor portion of heptenes. Similarly, the treatment of mixtures of isobutylene and propylene with hot sulfuric acid also results in a product comprising a major portion of iso-octenes and a minor portion of isoheptenes. Since large amounts of secondary olefin, such as propylene, are often available for polymerization, it is desirable to control polymerization reactions to produce an interpolymer including a secondary olefin and a tertiary olefin. In addition, there is a substantial demand for hydrocarbons suitable as a base stock for high octane safety aviation fuel with a boiling point from 300° F. upwardly and such material is not usually formed by the interpolymerization of only two of the molecules of the olefins commonly available for polymerization reactions.

In accordance with the present invention, polymerization reactions between olefins are controlled to obtain a polymer including a secondary olefin and a tertiary olefin and having a molecular weight greater than the sum of the molecular weight of a molecule of the secondary olefin and a single molecule of the tertiary olefin. The polymer is particularly suitable for use as a base stock for a safety aviation grade fuel after hydrogenation. Examples of tertiary olefins which may be used in the process of the present invention are isobutylenes, isopentylenes and isohexylenes, and examples of suitable secondary olefins are propylene, normal butylenes, normal pentylenes and normal hexylenes. Because of the availability of substantial amounts of the tertiary olefin, isobutylene, and the secondary olefins, propylene and pentylene, the present invention is particularly adapted for the formation of a polymer including isobutylene, and propylene or pentylene.

The present invention may be described briefly

2 as including the forming of an extract of a tertiary olefin in a liquid catalyst under temperature conditions to prevent substantial copolymerization of the tertiary olefin in the extract, the formation of another extract including a secondary olefin in a liquid catalyst under conditions to prevent substantial copolymerization of the secondary olefin in the extract, and the adjustment of the temperature of one or both extracts with a subsequent admixture thereof to cause the formation of a polymer of a molecular weight greater than the sum of the molecular weight of the secondary olefin and the molecular weight of tertiary olefin.

In the practice of the present invention, it is usually desirable to maintain the tertiary olefin at a temperature below normal room temperatures and to form the extract of a secondary olefin in the polymer at approximately room temperature with subsequent heating of the extract of the secondary olefin to a temperature of the order of 200° F. and the admixture of the tertiary olefin in the heated extract of the secondary olefin. As a variation of this procedure, the extract of the secondary olefin in a liquid catalyst may first be formed and divided into a minor portion and major portion, the minor portion may be cooled and used to absorb the tertiary olefin and the major portion may be heated and this heated portion admixed with the cooled portion which contains both secondary and tertiary olefins to cause the formation of an interpolymer including both secondary and tertiary olefins.

It is preferred to employ sulfuric acid of a strength in the range of 50 to 80 per cent as the liquid catalyst for the interpolymerization reaction of the present invention. When forming the extract of secondary olefin in sulfuric acid, the temperature of the sulfuric acid may be in the range of 50° to 125° F. Even at the highest temperature in this range there is little appreciable copolymerization of the secondary olefin. In the formation of the extract of the tertiary olefin in sulfuric acid, it is usually desirable to employ a somewhat lower range of temperature for the acid and preferably to maintain the temperature of the acid within the range of 30° to 50° F. It will be understood, however, that the formation of the copolymer of the tertiary olefin is a function of time as well as the temperature of the acid and it is possible to employ acid at a temperature as great as 125° F. in forming the extract of tertiary olefins but when employing a temperature of this order it is desirable that the resultant extract be used promptly to form the interpolymer. After the two extracts are formed, it is desirable to increase the temperature of the extract of the secondary olefin in the liquid catalyst to a range of 150° to 250° F. and to admix with this hot extract the cool extract of the tertiary olefin in liquid catalyst while maintaining the temperature of the admixture in the range of 150° to 250° F. to cause the formation of the interpolymer. In the mixing zone the amount of secondary olefin should be relatively large in comparison to the amount of tertiary olefin so that the molecules of the more readily polymerizable tertiary olefin are substantially separated and dispersed in a large excess of the less readily polymerizable secondary olefin. It is also desirable to disperse the extract of the tertiary olefin rapidly in the extract of the secondary olefin so that the tertiary olefin is dispersed in the heated secondary olefin extract before the molecules of the tertiary olefin have time to copolymerize.

It will be understood that the present invention may be practiced either as a continuous process or as a batch process. In the batch process the feed materials are added intermittently and the product is removed intermittently, whereas, in a continuous process the charge stock is added continuously and the product is removed continuously. It is also to be understood that if desired the extract including the secondary olefin may be formed into a large pool and the extract of the tertiary olefin added to the large pool and product removed therefrom with the charge material added to and the product removed from the pool either continuously or intermittently, as desired, or, alternatively, a stream of extract of tertiary olefin may be contacted with the stream of extract of secondary olefin and the components of the admixture allowed to react while continuing in motion as a stream and the resulting interpolymer subsequently separated from the stream.

Figure 2:
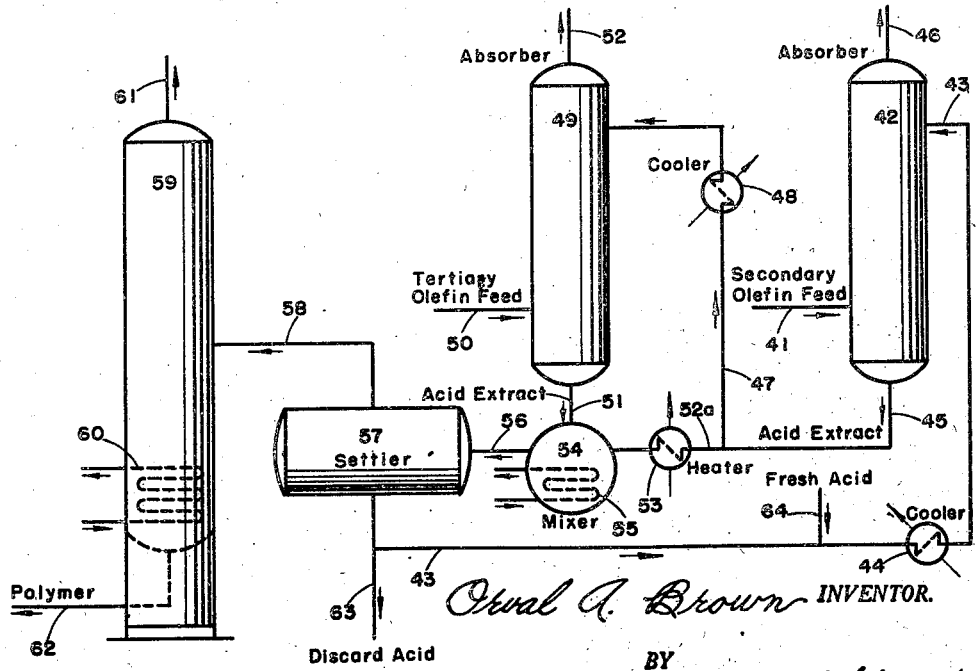

Preferred modifications of the present invention will now be described in conjunction with the drawing, in which Figure 1 is in the form of a flow sheet illustrating the formation of an extract including secondary olefin and a separate extract including tertiary olefin with the admixture of the two extracts, and Figure 2 illustrates a modification in which an extract of secondary olefin is formed and divided into two portions, with one portion heated and another portion cooled and used to absorb tertiary olefins and the two portions then admixed under conditions to cause the formation of an interpolymer.

Turning now specifically to the drawing, and first to Figure 1, inlet 11 conducts a mixture of isobutylene, normal butylene and butanes into a suitable absorption column 12 where it is contacted with 70 per cent sulfuric acid introduced into an upper portion of the column via inlet 13. The sulfuric acid introduced into the column is preliminarily cooled by cooler 14 to a temperature below which substantial polymerization of the tertiary olefins in the feed hydrocarbons will occur. It will be found desirable to maintain the temperature of the sulfuric acid in column 12 at approximately 40° F. If desired, the absorber may be equipped with cooling coils or a jacket, not shown, to aid in the maintenance of a desirable temperature in this vessel. The sulfuric acid flows downwardly through absorber 12 countercurrent to the upwardly flowing stream of gases and absorbs isobutylene therefrom. The resultant isobutylene extract in sulfuric acid is removed from the bottom of the absorber via line 15 and the unabsorbed hydrocarbons are removed from the top of the absorber through outlet 16.

A hydrocarbon fraction including propane and propylene is led through inlet 17 into the lower portion of a second absorber vessel 18 and is allowed to flow upwardly therein countercurrent to a stream of sulfuric acid which is introduced into an upper portion of the vessel through inlet 19 and flows downwardly through the vessel. The sulfuric acid introduced into the absorption vessel through line 19 is preliminarily cooled by cooler 20 to a temperature of approximately 60° F. and if desired a suitable temperature regulating means, such as cooling coils or jackets, not shown, may be applied to tower 18 in order to maintain a desired temperature in this tower. The extract of the secondary olefin, propylene, in sulfuric acid, is removed from the bottom of tower 18 via line 21 and the unabsorbed hydrocarbons are removed from the top of the tower via outlet 22. The extract of the secondary olefin in sulfuric acid is passed from line 21 to heater 23 where it is heated to a temperature in the range of 150° F. to 300° F. and is subsequently discharged into mixing vessel 24 which may be provided with heating coil 25 to maintain a suitable temperature therein. The extract of tertiary olefin in sulfuric acid is introduced into mixing vessel 24 by means of line 15 and is thoroughly and rapidly admixed with the extract of the secondary olefin therein. While the components are being admixed, the temperature within vessel 24 is maintained at a suitable level to cause the formation of an interpolymer including secondary and tertiary olefins so that in effect the heating of the tertiary olefin extract and its admixture with the secondary olefin extract take place simultaneously. The amounts of the two extracts introduced into vessel 24 are adjusted to maintain a large excess of secondary olefin over that required to combine chemically with the tertiary olefin in order to control more satisfactorily the direction of the reaction and to insure the formation of a polymer including secondary and tertiary olefins rather than the formation of a copolymer of tertiary olefin.

From vessel 24 the admixture is withdrawn through line 26 to settling vessel 27 where it is allowed to separate under the influence of gravity into a heavier acid layer and a lighter hydrocarbon layer. The hydrocarbon layer is removed from an upper portion of vessel 27 through line 28 and is passed into a fractionating column 29 provided with heating means 30. In the fractionating column the unreacted feed hydrocarbons are removed as overhead through line 31 and may be recycled to the system by means, not shown, while the higher boiling polymer is removed through line 32.

The acid accumulating in the lower portion of settler 27 may be withdrawn through line 33 and recirculated to lines 13 and 19 to act as absorption liquid for additional tertiary olefin and secondary olefin in towers 12 and 18, respectively. Usually it will be desirable to maintain the acid strength at a predetermined concentration and a convenient method for accomplishing this is by the continuous withdrawal of a portion of the acid through outlet 34 and the continuous admixture of fresh acid into line 33 by means of inlet 35.

Another modification of the present invention may be practiced in the apparatus shown in Figure 2. In this figure, a propane-propylene fraction is introduced via line 41 into the lower portion of absorber tower 42 and is allowed to flow upwardly therein countercurrent to a stream of sulfuric acid introduced into the upper end of the tower through inlet 43. It is preferred to employ 70 per cent sulfuric acid as the absorbent medium to tower 42 and to cool preliminarily the acid to a temperature approximately 60° F. in cooler 44 before introducing it into the tower. If desired, suitable temperature regulating means, such as cooling coils or a jacket, not shown, may be employed to regulate the temperature within tower 42. An extract of propylene and sulfuric acid is removed from the bottom of the tower via line 45 and unabsorbed gases are removed from the top of the tower by outlet 46.

The stream of propylene-sulfuric acid extract in line 45 is split with a minor portion being diverted through branch line 47 containing cooler 48 where it is cooled to a temperature of approximately 40° F. The cooled propylene-sulfuric acid extract is then discharged into the upper end of a second absorption tower 49 where it is allowed to flow downwardly countercurrent to a rising stream of gases. A mixture of isobutylene, normal butylene and butanes is introduced into the lower portion of tower 49 via inlet 50 and flows upwardly countercurrent to the propylene-sulfuric acid extract. The isobutylene is absorbed from the gaseous mixture to form an extract of isobutylene and propylene-sulfuric acid and this extract is removed from the bottom of tower 49 through line 51. The unabsorbed hydrocarbons are discharged from the top of tower 49 through outlet 52.

The major portion of the propylene-sulfuric acid extract in line 45 is passed into line 52a and through heater 53 where it is heated to a temperature in the range of 150° to 300° F. and the hot extract is then discharged into mixing vessel 54. The chilled extract including isobutylene, propylene and sulfuric acid through line 51 is also discharged into mixing vessel 54 and is admixed rapidly and intimately with the propylene-sulfuric acid extract. If desired, the temperature within mixing vessel 51 may be regulated by heating coil 55. It will be evident that since the major portion of the propylene-sulfuric acid extract from tower 42 is passed through heater 53 and into the mixing vessel that the mixing vessel contains a large excess of secondary olefin over that required to combine chemically with the tertiary olefin. The temperature of the components within mixing vessel 54 is sufficiently great to cause the formation of a interpolymer including secondary and tertiary olefin so that in effect the heating of the tertiary olefin in the extract and its admixture with the large excess of secondary olefin within vessel 54 take place simultaneously.

From vessel 54 the mixture is withdrawn through line 56 to a settling vessel 57 where it is allowed to separate under the influence of gravity into a heavier acid layer and a lighter hydrocarbon layer. The hydrocarbon layer is removed through line 58 and passed into a fractionating column 59 provided with a heating means 60. In the fractionating column the unreacted feed hydrocarbons may be removed as overhead through line 61 and may be recycled to the process by a suitable means, not shown, and the higher boiling polymer may be removed through line 62. The acid accumulated in the lower portion of settler 57 may be withdrawn through line 43 and recirculated in cooler 44 and back to absorption tower 42. In order to maintain the acid strength of a predetermined concentration a portion of the acid may be withdrawn through line 63 and fresh acid added by inlet 64.

The present invention will be further illustrated by reference to a specific operation in which extracts of a tertiary olefin and a secondary olefin were polymerized.

A secondary olefin, in this instance propylene predominately, was formed in an extract with sulfuric acid. The propylene fraction had a composition as follows:

| | Percent by volume |
|---|---|
| Ethane | 4.5 |
| Propylene | 85.3 |
| Propane | 9.2 |
| Butanes | 1.0 |

A fraction having this composition was contacted with 70% sulfuric acid at a temperature between 60° and 70° F. for approximately 60 minutes under conditions of good agitation. Approximately 9.5 volumes of the aforementioned hydrocarbon fraction was contacted with 5 volumes of the sulfuric acid. After the period of contact mentioned, agitation was stopped and the acid extract layer separated from the hydrocarbon layer. This extract was then stored for handling in a manner which will be described subsequently.

In a similar manner to the preparation of the propylene extract an isobutylene containing fraction of the following composition:

| | Percent by volume |
|---|---|
| Butanes | 61.3 |
| Isobutylene | 14.8 |
| n-Butylenes | 23.9 | was contacted with sulfuric acid at a temperature between 60° and 65° F. for approximately 30 minutes. About 7 volumes of the isobutylene fraction was admixed with about 3 volumes of the sulfuric acid. After the period of contact mentioned the hydrocarbon layer was separated from the acid layer which was withdrawn and stored at a reduced temperature of about 32° F.

Fifty-eight volumes of the aforementioned propylene acid extract was heated to a temperature of 200° F. while agitating thoroughly. To this heated propylene extract was added 30 volumes of the cold isobutylene acid extract previously described. This second cold extract was added to the heated propylene acid extract slowly over a period of 20 minutes while agitating the mixture. It will be seen that the ratio of secondary olefin extract to tertiary olefin extract was approximately 1.9 to 1.

After the period of agitation mentioned, mixing was stopped and the hydrocarbon and acid layer allowed to separate under the influence of gravity into two layers: an acid layer and a hydrocarbon layer; the hydrocarbon layer was withdrawn from the mixing vessel and submitted for analysis. It was found that the polymer had an olefinic composition as follows:

| | Percent by volume |
|---|---|
| $C_7$ | 10.5 |
| $C_8$ | 12.0 |
| $C_9$ | 6.0 |
| $C_{10}$ | 26.0 |
| $C_{11}$ | 22.0 |
| $C_{12}$ | 23.5 |
| | 100.0 |

It will be noted that 71.5% of the polymer comprised olefinic hydrocarbons of 10 to 12 carbon atoms.

The total polymer fraction, which had a bromine number of 108, was hydrogenated at 425° F. and at a hydrogen pressure of 1800 pounds per square inch over a hydrogenation catalyst. The product from the hydrogenation had a bromine number of 1.4 The hydrogenated product was then distilled and separated into two fractions: one boiling between 150 and 325° F., and the other boiling between 325 and 369° F. Octane numbers of these two fractions were 84.5 and 85.8, respectively, indicating that both of them were suitable for inclusion in aviation fuel, the latter fraction being especially suitable for inclusion in a safety aviation fuel on account of its high initial boiling point and high octane number. It is possible to increase further the octane number of the hydrogenated fraction by adding tetraethyl lead thereto to obtain octane numbers of 100 or better. Usually not more than 4 cc. of lead is needed to obtain 100 octane number with a fuel having a clear octane number in the range of 85.

While the present invention has been described in a specific example as a batch operation, it will be apparent to the skilled worker that it is within the scope of the invention to employ either batch or continuous operation. It is essential for best results that good contact between hydrocarbon and acid be obtained in forming the extract and that the secondary olefin extract be maintained in large excess to the tertiary olefin extract during the polymerization operation.

Having fully described and illustrated the practice of the present invention, what I wish to claim is:

1. A process for producing an interpolymerization product of a secondary olefin with a tertiary olefin which comprises the steps of forming a first extract by selectively absorbing a tertiary olefin in sulfuric acid maintained at a temperature no greater than 125° F. to prevent substantial copolymerization of the tertiary olefin, forming a second extract by selectively absorbing a secondary olefin in sulfuric acid maintained at a temperature no greater than 125° F. to prevent substantial copolymerization of the secondary olefin, heating the second extract to a temperature of at least 150° F., mixing the heated second extract with the first extract in a mixing zone while maintaining a substantial excess of secondary olefin over tertiary olefin in the mixing zone and a temperature of at least 150° F. in the mixing zone to cause rapid interpolymerization of the secondary and tertiary olefin, removing product from the mixing zone and separating polymer therefrom.

2. A process in accordance with claim 1 in which a stream of first extract is admixed with a stream of second extract in the mixing zone and in which the product is removed continuously from the mixing zone.

3. A process in accordance with claim 1 in which the heated second extract is formed into a pool and into which first extract is added to the pool with intimate and rapid mixing.

4. A process for producing an interpolymerization product of isobutylene with propylene which comprises the steps of forming a first extract by absorbing isobutylene in sulfuric acid having a strength in the range of 60 to 70 per cent and a temperature of 40° F. forming a second extract by absorbing propylene in sulfuric acid having a strength in the range of 60 to 70 per cent and at a temperature of 60° F., heating the second extract to a temperature in the range of 150° to 250° F., mixing first extract with heated second extract in a mixing zone and maintaining a large excess of propylene extract over isobutylene extract in the mixing zone to cause rapid interpolymerization, removing product from the mixing zone and separating polymer therefrom.

5. A process in accordance with claim 4 in which a stream of first extract and a stream of second extract are added continuously to the mixing zone and in which product is removed continuously from the mixing zone as a stream.

6. A process in accordance with claim 4 in which second extract is formed into a pool and the first extract is added to the pool with rapid and thorough admixture.

ORVAL A. BROWN.

REFERENCES CITED

The following references are of record in the file of this patent:

UNITED STATES PATENTS

| Number | Name | Date |
|---|---|---|
| 2,171,928 | Gage | Sept. 5, 1939 |
| 2,174,247 | McAllister | Sept. 26, 1939 |
| 2,181,640 | Deanesly | Nov. 28, 1939 |
| 2,181,942 | Ipatieff | Dec. 5, 1939 |
| 2,300,817 | Sweeney | Nov. 3, 1942 |
| 2,300,818 | Sweeney | Nov. 3, 1942 |
| 2,228,669 | McAllister | Jan. 14, 1941 |
| 2,366,171 | Belchetz | Jan. 2, 1945 |

FOREIGN PATENTS

| Number | Country | Date |
|---|---|---|
| 530,250 | Great Britain | Dec. 9, 1942 |

OTHER REFERENCES

Whitmore article in Jour. Amer. Chem. Soc., vol. 63, Mar. 1941, pages 756–757.